(12) United States Patent
Small (10) Patent No.: US 9,335,859 B2
(45) Date of Patent: May 10, 2016

(54) ADAPTIVE TOUCH SENSING ELECTRODE

(71) Applicant: Synaptics Incorporated, San Jose, CA (US)

(72) Inventor: Jeffrey A. Small, Rochester, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 59 days.

(21) Appl. No.: 14/231,303

(22) Filed: Mar. 31, 2014

(65) Prior Publication Data

US 2015/0277648 A1    Oct. 1, 2015

(51) Int. Cl.
  *G06F 3/045*    (2006.01)
  *G06F 3/041*    (2006.01)
  *G06F 3/044*    (2006.01)

(52) U.S. Cl.
  CPC .............. *G06F 3/0416* (2013.01); *G06F 3/044* (2013.01); *G06F 2203/04101* (2013.01)

(58) Field of Classification Search
  CPC ... G06F 3/03547; G06F 3/044; H03K 17/955; H03K 17/962; H03K 2217/94026
  USPC .................................................. 345/156, 174
  See application file for complete search history.

(56) References Cited

U.S. PATENT DOCUMENTS

| | | | |
|---|---|---|---|
| 4,550,310 A | 10/1985 | Yamaguchi et al. | |
| 6,054,979 A | 4/2000 | Sellers | |
| 7,417,441 B2 | 8/2008 | Reynolds | |
| 7,583,092 B2 | 9/2009 | Reynolds et al. | |
| 7,663,607 B2 | 2/2010 | Hotelling et al. | |
| 7,859,521 B2 | 12/2010 | Hotelling et al. | |
| 8,243,027 B2 | 8/2012 | Hotelling et al. | |
| 8,258,986 B2 | 9/2012 | Makovetskyy | |
| 8,305,359 B2 | 11/2012 | Bolender et al. | |
| 2002/0185981 A1 | 12/2002 | Dietz et al. | |
| 2008/0062140 A1 | 3/2008 | Hotelling et al. | |
| 2008/0062147 A1 | 3/2008 | Hotelling et al. | |
| 2008/0062148 A1 | 3/2008 | Hotelling et al. | |
| 2008/0246723 A1* | 10/2008 | Baumbach | 345/156 |
| 2010/0001973 A1 | 1/2010 | Hotelling et al. | |
| 2010/0144391 A1 | 6/2010 | Chang et al. | |
| 2010/0193257 A1 | 8/2010 | Hotelling et al. | |
| 2010/0194695 A1 | 8/2010 | Hotelling et al. | |
| 2010/0194697 A1 | 8/2010 | Hotelling et al. | |
| 2010/0253638 A1 | 10/2010 | Yousefpor et al. | |
| 2010/0292945 A1 | 11/2010 | Reynolds et al. | |
| 2011/0006999 A1 | 1/2011 | Chang et al. | |

(Continued)

OTHER PUBLICATIONS

U.S. Appl. No. 14/180,024.

(Continued)

*Primary Examiner* — Alexander Eisen
*Assistant Examiner* — Kuo Woo
(74) *Attorney, Agent, or Firm* — Patterson + Sheridan, LLP (57) ABSTRACT

Techniques for varying aggregate area of a sensor electrode used for capacitive sensing. Sensor electrodes are driven for capacitive sensing. Resulting signals are received from the sensor electrodes. Based on signal strengths of the resulting signals, aggregate area of the sensor electrodes may be varied. The aggregate area of the sensor electrodes may be varied by connecting or disconnecting segments of the sensor electrodes from a sensor module that drives the sensor electrodes for capacitive sensing. The ability to vary the aggregate area of the sensor electrodes expands the overall dynamic range of a receiver module coupled to the sensor electrodes.

20 Claims, 5 Drawing Sheets

(56) References Cited

U.S. PATENT DOCUMENTS

| | | |
|---|---|---|
| 2011/0007030 A1 | 1/2011 | Mo et al. |
| 2011/0025635 A1 | 2/2011 | Lee |
| 2011/0242444 A1 | 10/2011 | Song |
| 2011/0248949 A1 | 10/2011 | Chang et al. |
| 2011/0284949 A1 | 11/2011 | Meng et al. |
| 2011/0298746 A1 | 12/2011 | Hotelling |
| 2012/0038585 A1 | 2/2012 | Kim |
| 2012/0182251 A1 | 7/2012 | Krah |
| 2012/0218199 A1 | 8/2012 | Kim et al. |
| 2013/0057507 A1 | 3/2013 | Shin et al. |
| 2013/0088372 A1 | 4/2013 | Lundstrum et al. |
| 2013/0162570 A1 | 6/2013 | Shin et al. |
| 2013/0215075 A1 | 8/2013 | Lee et al. |
| 2014/0354585 A1* | 12/2014 | Cok et al. .................... 345/174 |

OTHER PUBLICATIONS

U.S. Appl. No. 14/042,661.

U.S. Appl. No. 14/042,673.

* cited by examiner

FIG. 4

ADAPTIVE TOUCH SENSING ELECTRODE

BACKGROUND OF THE INVENTION

1. Field of the Invention

Embodiments of the present invention generally relate to a method and apparatus for capacitive sensing, and more specifically, an adaptive touch sensing electrode.

2. Description of the Related Art

Input devices including proximity sensor devices (also commonly called touchpads or touch sensor devices) are widely used in a variety of electronic systems. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

A proximity sensor device typically includes sensor electrodes that are driven with signals for capacitive sensing. Receiver circuitry receives resulting signals from the sensor electrodes for determining positional information of one or more input objects near the proximity sensor device, if any are present. The receiver circuitry generally has a dynamic range that determines the range of signal strengths of the resulting signals from which meaningful positional information may be derived. If the dynamic range of receiver circuitry is exceeded, meaningful data may not be extracted from signals received as a result of driving the sensor electrode for capacitive sensing.

As the foregoing illustrates, what is needed in the art are techniques for improving utilization of the dynamic range of receiver circuitry in a proximity sensor device.

SUMMARY

One embodiment of the present disclosure includes a processing system for an input device. The processing system comprises a sensor module comprising sensor circuitry. The sensor module is configured to drive a first number of a first plurality of segments comprising a first sensor electrode of a plurality of sensor electrodes of the input device to determine a first capacitive coupling between the first sensor electrode and an input object. The sensor module is also configured to drive a second number of the first plurality of segments of the first sensor electrode to determine a second capacitive coupling between the first sensor electrode and the input object, in response to determining that the first capacitive coupling is outside of an operating range of the sensor module corresponding to the first number of segments.

Another embodiment of the present disclosure includes an input device. The input device includes a plurality of sensor electrodes and a sensor module comprising sensor circuitry. The sensor module is configured to drive a first number of a first plurality of segments comprising a first sensor electrode of the plurality of sensor electrodes to determine a first capacitive coupling between the first sensor electrode and an input object. The sensor module is also configured to drive a second number of the first plurality of segments of the first sensor electrode to determine a second capacitive coupling between the first sensor electrode and the input object in response to determining that the first capacitive coupling is outside of an operating range of the sensor module corresponding to the first number of segments.

Another embodiment of the present disclosure includes a method for operating an input device. The method includes driving a first number of a first plurality of segments comprising a first sensor electrode of a plurality of sensor electrodes of the input device to determine a first capacitive coupling between the first sensor electrode and an input object. The method also includes driving a second number of the first plurality of segments of the first sensor electrode to determine a second capacitive coupling between the first sensor electrode and the input object, in response to determining that the first capacitive coupling is outside of an operating range of the sensor module corresponding to the first number of segments.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide sensor electrodes including multiple sensor electrode segments for improving utilization of the dynamic range of receiver circuitry coupled to the sensor electrodes. Any of the sensor electrode segments within the sensor electrode may be enabled or disabled when the sensor electrode is driven for capacitive sensing. Enabling or disabling different sensor electrode segments changes the area of the sensor electrode that is driven and thereby changes the strength of the resulting signal received as a result of driving the sensor electrode for capacitive sensing. This ability to change the strength of the resulting signal expands the total effective dynamic range corresponding to the sensor electrode, allowing desirable signals to be detected in a wider range of conditions than if the sensor electrodes did not have the multiple sensor electrode segments. In one example, this ability to expand the dynamic range allows an input device that includes the sensor electrode to detect input objects at a wider range of distances from the sensor electrode than if the sensor electrode did not include the multiple sensor electrode segments.

Figure 1:
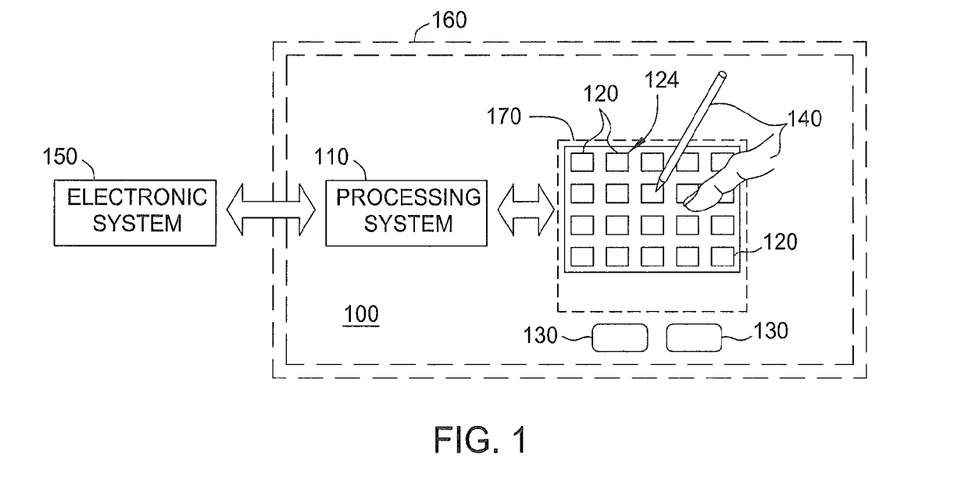
FIG. 1 is a schematic block diagram of an input device integrated into an exemplary display device, according to one embodiment described herein.

FIG. 1 is a schematic block diagram of an input device 100 integrated into an exemplary display device 160, in accordance with embodiments of the present technology. Although the illustrated embodiments of the present disclosure are shown integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some nonlimiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system 150 using any one or more of the following: buses, networks, and other wired or wireless interconnections. Examples include I$^2$C, SPI, PS/2, Universal Serial Bus (USB), Bluetooth, RF, DisplayPort and IRDA.

In FIG. 1, the input device 100 is shown as a proximity sensor device (also often referred to as a "touchpad" or a "touch sensor device") configured to sense input provided by one or more input objects 140 in a sensing region 170. Example input objects 140 include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing electrodes 120 for detecting user input. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing electrodes 120 to create electric fields. In some capacitive implementations, separate sensing electrodes 120 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes")

and one or more receiver sensor electrodes (also "receiver electrodes") as further described below. Transmitter sensor electrodes may be modulated relative to a reference voltage (e.g., system ground) to transmit a transmitter signal. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing electrodes 120 of the input device 100. In other embodiments, components of processing system 110 are physically separate with one or more components close to sensing electrodes 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing electrodes 120 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing electrodes 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
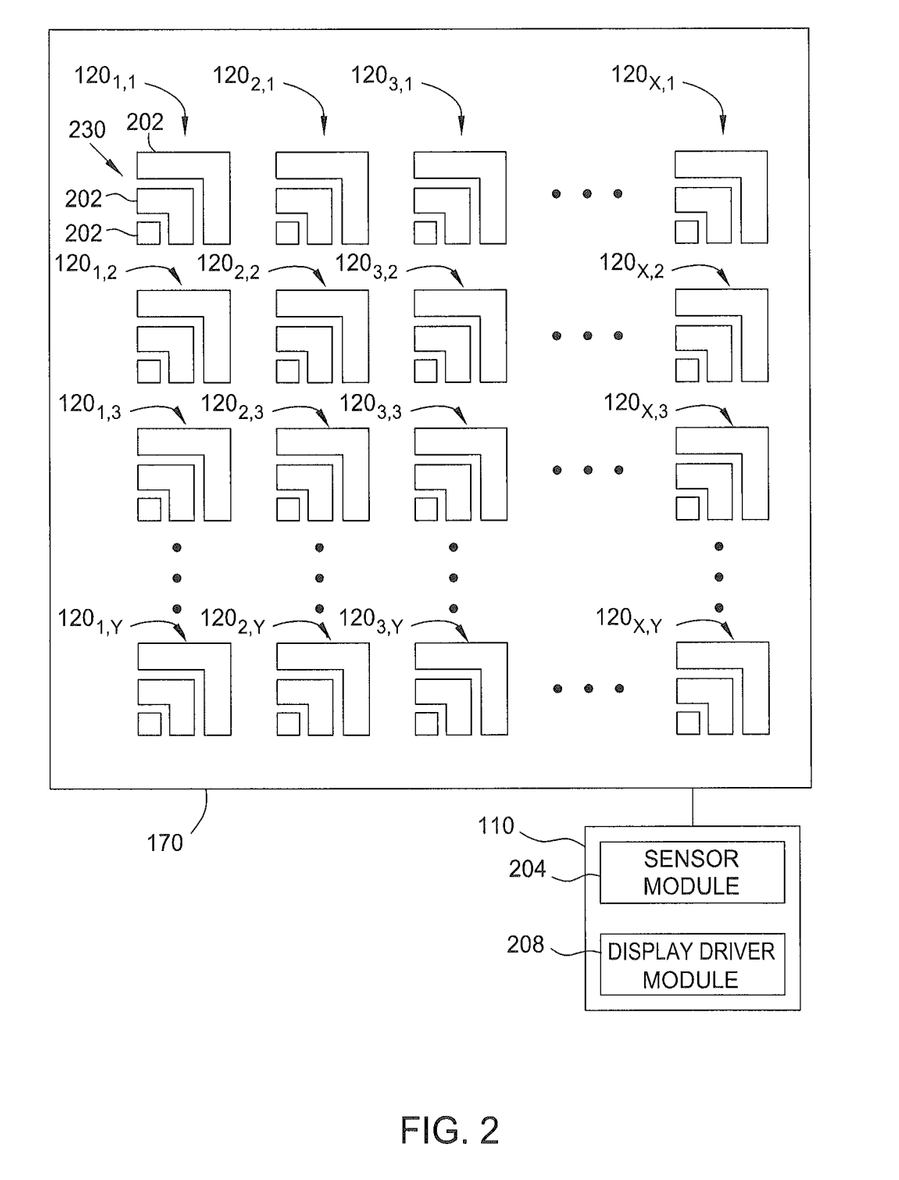
FIG. 2 illustrates a simplified exemplary array of sensor elements that may be used in the input device of FIG. 1, according to one embodiment described herein.

FIG. 2 shows a portion of an exemplary pattern of sensing electrodes 120 configured to sense in the sensing region 170 associated with the pattern, according to some embodiments. For clarity of illustration and description, FIG. 2 shows the sensor electrodes 120 in a pattern of simple rectangles and does not show various other components. The exemplary pattern comprises an array of sensor electrodes $120_{X,Y}$ (referred collectively as sensor electrodes 120) arranged in X columns and Y rows, wherein X and Y are positive integers. It is contemplated that the pattern of sensing electrodes 120 may comprise a plurality of sensor electrodes 120 having other configurations, such as polar arrays, repeating patterns, non-repeating patterns, non-uniform arrays, a single row or column, or other suitable arrangement. Further, the sensor electrodes 120 may be any shape such as circular, rectangular, diamond, star, square, non-convex, convex, non-concave concave, etc. The sensor electrodes 120 are coupled to the processing system 110 and utilized to determine the presence (or lack thereof) of an input object 140 in the sensing region 170.

In a first mode of operation, at least a portion of the arrangement of sensor electrodes 120 ($120_{1,1}$, $120_{1,2}$, $120_{1,3}$, ... $120_{2,1}$, ... $120_{3,1}$, ... $120_{X,Y}$) may be utilized to detect the presence of an input object via absolute sensing techniques. That is, processing system 110 is configured to drive each sensor electrode 120 with a modulated signal and measure a capacitance between the electrode 120 and the input object (e.g., free space or earth ground or system ground) based on the modulated signal, which is utilized by the processing system 110 or other processor to determine the position of the input object.

The sensor electrodes 120 are typically ohmically isolated from each other. That is, one or more insulators separate the sensor electrodes 120 and prevent them from electrically shorting to each other.

In a second mode of operation, at least a portion the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitance (capacitive coupling) may be termed "capacitive pixels." Capacitive pixels may be formed between an individual sensor electrode 120 and ground in the first mode of operation and between groups of sensor electrodes 120 used as transmitter and receiver electrodes in the second mode of operation. The capacitive coupling changes with the proximity and motion of input objects 140 in the sensing region 170 associated with the sensing electrodes 120, and thus may be used as an indicator of the presence of the input object in the sensing region of the input device 100.

In some embodiments, the sensor electrodes 120 are "scanned" to determine measurements that correspond to the capacitive couplings between transmitter and receiver electrodes. That is, in one embodiment, one or more of the sensor electrodes 120 are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes 120 configured as receiver sensor electrodes may be operated singly or multiply to acquire resulting signals. The resulting signals may be used to determine measurements of the capacitive couplings at the capacitive pixels.

In other embodiments, "scanning" sensor electrodes 120 to determine these capacitive couplings comprises driving with a modulated signal and measuring the absolute capacitance of one or more of the sensor electrodes. In another embodiment, the sensor electrodes may be operated such that more than one sensor electrode is driven at a time, or multiple sensor electrodes are driven at the same time. In such embodiments, an absolute capacitive measurement may be obtained from each of the one or more sensor electrodes 120 simultaneously. In one embodiment, the input device 100 simultaneously drives a plurality of the sensor electrodes 120 and measures an absolute capacitive measurement for each of the driven electrodes 120 in the same sensing cycle. In various embodiments, processing system 110 may configured to selectively drive and receive with a portion of sensor electrodes 120. For example, the sensor electrodes may be selected based on, but not limited to, an application running on the host processor, a status of the input device, an operating mode of the sensing device and a determined location of an input device.

In some embodiments, the sensor electrodes 120 include an arrangement 230 of sensor electrode segments 202 (also referred to herein as "segment patterns"). The sensor electrode segments 202 are typically ohimcally isolated from each other. That is, one or more insulators separate the sensor electrode segments 202 and prevent them from electrically shorting to each other. Sensor module 204 may select any number of the sensor electrode segments 202 within a particular sensor electrode 120 to be driven for capacitive sensing. In some embodiments, driving a particular number of sensor electrode segments 202 for capacitive sensing includes driving those sensor electrode segments 202 with the same (or approximately the same) signal and receiving a resulting signal in response.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. In embodiments in which sensor electrode 120 includes multiple sensor electrode segments 202, baseline images may be taken for two or more different groups of sensor electrode segments 202 within the sensor electrode 120. For example, a baseline image may be taken for a configuration in which only two out of three sensor electrode segments 202 are driven for capacitive sensing, and another baseline image may be taken for a different configuration in which three out of three sensor electrode segments 202 are driven for capacitive sensing.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. In one or more embodiment, the display electrodes comprise one or more segments of a Vcom electrode (common electrodes), a source drive line, a gate line, an anode electrode or cathode electrode, or any other display element. These display electrodes may be disposed on an appropriate display screen substrate. For example, the common electrodes may be disposed on the transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. (for OLEDs, the substrate may not be transparent.). In such embodiments, the display electrode can also be referred to as a "combination electrode", since it performs multiple functions. In various embodiments, each of the sensor electrodes 120 comprises one or more common electrodes. In other embodiments, at least two sensor electrodes 120 may share at least one common electrode. In embodiments where the sensor electrodes 120 comprise one or more segments of a Vcom electrode, each sensor electrode segment 202 of the sensor electrodes 120 may comprise different segments of the Vcom electrode. (In such embodiments, the sensor electrode segments 202 may be termed "common electrode segments").

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate.

Continuing to refer to FIG. 2, the processing system 110 coupled to the sensing electrodes 120 includes a sensor module 204 and optionally, a display driver module 208. In one embodiment the sensor module comprises circuitry ("sensor circuitry") configured to drive a transmitter signal or a modulated signal onto and receive resulting signals from the sensing electrodes 120 during periods in which input sensing is desired. In one embodiment the sensor module comprises a transmitter module including circuitry configured to drive a transmitter signal onto the sensing electrodes 120 during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region 170. The modulated signal used in absolute capacitive sensing may be the same or different from the transmitter signal used in transcapacitive sensing. The sensor module may be selectively coupled to one or more of the sensor electrodes 120. For example, the sensor module 204 may be coupled to selected portions of the sensor electrodes 120 and operate in either an absolute or transcapacitive sensing mode. In another example, the sensor module 204 may be a different portion of the sensor electrodes 120 and operate in either an absolute or transcapacitive sensing mode. In yet another example, the sensor module 204 may be coupled to all the sensor electrodes 120 and operate in either an absolute or transcapacitive sensing mode.

In various embodiments the sensor module 204 may comprise a receiver module that includes circuitry configured to receive a resulting signal with the sensing electrodes 120 comprising effects corresponding to the transmitter signal during periods in which input sensing is desired. In one or more embodiments, the receiver module is configured to drive a modulated signal onto a sensor electrode 120 and receive a resulting signal corresponding to the modulated signal to determine changes in absolute capacitance of the sensor electrode 120. As a further example, the receiver module could drive a modulated voltage onto a sensor electrode 120 and receive a resulting modulated current from the sensor electrode 120 in response. The receiver module may determine a position of the input object 140 in the sensing region 170 or may provide a signal including information indicative of the resulting signal to another module or processor, for example, determination module or a processor of the electronic device 150 (i.e., a host processor), for determining the position of the input object 140 in the sensing region 170. In one or more embodiments, the receiver module comprises a plurality of receivers, where each receiver may be an analog front end (AFEs).

As discussed above, when a sensor electrode 120 is driven for capacitive sensing, a receiver module within sensor module 204 receives resulting signals that correspond to the presence and position of an input object 140 in sensing region. The strength (e.g., voltage level) of the resulting signal depends on the presence and proximity of an input object 140 as well as the total area of the sensor electrode segments 202 in a sensor electrode 120 that are driven for capacitive sensing.

As discussed above, a receiver module that is coupled to a sensor electrode 120 for receiving resulting signals has a particular operating range. The operating range corresponding is a range of strengths of resulting signals (e.g., voltage levels) that allows processing system 110 to derive meaningful information about the input object 140. In one example, the receiver module includes an operational amplifier for receiving resulting signals. The operating range includes the range of signal strengths (e.g., voltages) of resulting signals that maintains the operational amplifier in a linear operating range.

To better utilize an operating range of a receiver module, sensor module 204 selects a particular group of sensor electrode segments 202 within a particular sensor electrode 120 to drive for capacitive sensing. Increasing the aggregate area of a sensor electrode 120 that is driven for capacitive sensing (e.g., driving a greater number of sensor electrode segments 202 comprising the sensor electrode 120) increases the strength of the resulting signal received by the receiver circuitry. Similarly, decreasing the aggregate area of the sensor electrode 120 that is driven for capacitive sensing decreases the strength of the resulting signal received by the receiver circuitry. By adjusting the strength resulting signal up or down in this manner, the resulting signal can be made to fall within the operating range of the receiver module.

The ability to vary the strength of the resulting signal in this manner expands the effective overall operating range of the receiver module, as compared with a sensor electrode 120 that includes a single segment or a fixed number of segments. In other words, because the number of sensor electrode segments 202 that are driven for capacitive sensing can be varied to select the aggregate area of the sensor electrode 120, the overall effective operating range is effectively enlarged (even though the actual operating range of the receiver module remains the same).

Sensor module 204 may select the number of sensor electrode segments 202 driven for capacitive sensing based on a signal strength of a previously received resulting signal. In one scenario, sensor module 204 drives a particular number of sensor electrode segments 202 of a particular sensor electrode 120 for capacitive sensing and receives a resulting signal in response. Sensor module 204 determines that the resulting signal is below a low threshold for the operating range corresponding to the configuration of sensor electrode segments 202 that were driven for capacitive sensing. In response to this determination, sensor module 204 increases the aggregate area of the sensor electrode 120 with which to drive the sensor electrode 120, in order to increase the strength of the signal received from the sensor electrode 120 (by, for example, increasing the number of sensor electrode segments 202). Subsequently, sensor module 204 drives the sensor electrode 120 with the increased number of sensor electrode segments 202 for capacitive sensing.

In another scenario, sensor module 204 drives a particular number of sensor electrode segments 202 of a particular sensor electrode 120 for capacitive sensing. Subsequently, sensor module 204 (or another module in processor element 110 or electronic system 150) receives a resulting signal based on the signal with which the sensor electrode 120 is driven and determines that the resulting signal is above a high threshold for the operating range corresponding to the configuration of sensor electrode segments 202 that were driven for capacitive sensing. In response to this determination, sensor module 204 reduces the aggregate area of sensor electrode segments 202 with which to drive the sensor electrode 120, in order to decrease the strength of the signal received from the sensor electrode 120 (by, for example, decreasing the number of sensor electrode segments 202). Subsequently, sensor module 204 drives the sensor electrode 120 with the reduced number of sensor electrode segments 202 for capacitive sensing.

The arrangement of each sensor electrode 120 includes the size, position, and configuration of the sensor electrode segments 202 within the sensor electrode 120. Many such arrangements are possible. Several example arrangements are illustrated in and described with respect to FIGS. 3A-3C.

The arrangements of sensor electrode segments 202 within different sensor electrodes 120 in a particular input device 100 may vary. In one example, sensor electrodes 120 located near a center of sensing region 170 may have a different arrangement of sensor electrode segments 202 than sensor electrodes 120 located near a periphery of the sensing region 170. Additionally, where an input device includes at least some sensor electrodes 120 with the same arrangement of sensor electrode segments 202, the thresholds at which the sensor module 204 changes the number of sensor electrode segments 202 that are driven for capacitive sensing may be different in different locations of the sensing region 170. In one example, sensor electrodes 120 in the center of the sensing region 170 may be driven for capacitive sensing with two segments 202 while sensor electrodes 120 in the periphery of the sensing region 170 may be driven for capacitive sensing with three segments 202 despite those sensor electrodes having received approximately the same resulting signals.

In one or more embodiments, capacitive sensing (or input sensing) and display updating may occur during at least partially overlapping periods. For example, as a common electrode is driven for display updating, the common electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes 120 for capacitive sensing during any one or more of or any combination of the different non-display update times.

The display driver module 208 includes circuitry confirmed to provide display image update information to the display of the display device 160 during non-sensing (e.g., display updating) periods. The display driver module 208 may be included with or separate from the sensor module 204. In one embodiment, the processing system comprises a first integrated controller comprising the display driver module 208 and at least a portion of the sensor module 204 (i.e., transmitter module and/or receiver module). In another embodiment, the processing system comprises a first integrated controller comprising the display driver 208 and a second integrated controller comprising the sensor module 204. In yet another embodiment, the processing system comprises a first integrated controller comprising a display driver module 208 and one of a transmitter module or a receiver module and a second integrated controller comprising the other one of the transmitter module and receiver module.

As discussed above, the sensor electrodes 120 may be formed as discrete geometric forms, polygons, bars, pads, lines or other shape, which are ohmically isolated from one another. The sensor electrodes 120 may be electrically coupled through circuitry to form electrodes of having larger plan area relative to a discrete one of the sensor electrodes 120. The sensor electrodes 120 may be fabricated from opaque or non-opaque conductive materials. In embodiments wherein the sensor electrodes 120 are utilized with a display device, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include ITO, aluminum, silver, copper, and conductive carbon materials, among others. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed a mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not similar, and one of the length and width may be in the range of about 1 to about 2 mm. Further, on various embodiments, the sensor electrodes 120 may comprise a center to center pitch in the range of about 4 to about 5 mm; however, in other embodiments, the pitch may be less than about 4 mm or greater than about 5 mm. Further, in various embodiments the sensor electrode comprises the entire Vcom electrode (common electrode(s)).

Figure 3A:
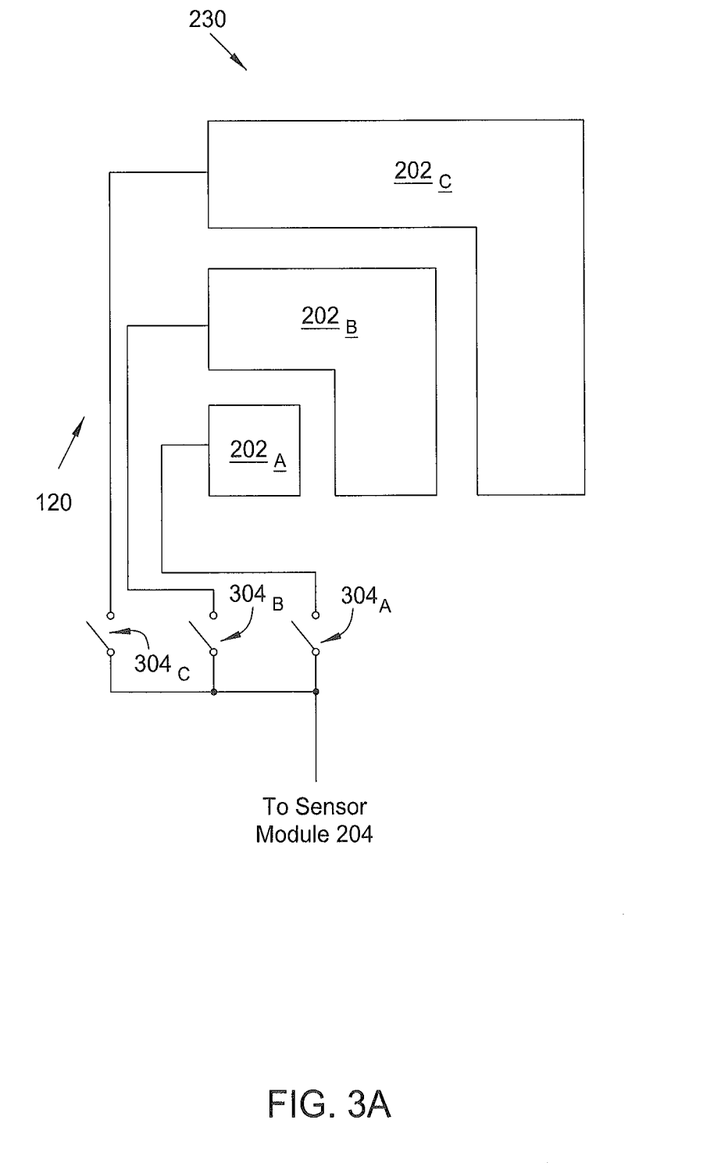
FIGS. 3A-3C illustrate example arrangements of sensor electrode segments, according to one embodiment described herein.

FIG. 3A is an illustration of an arrangement 230 of sensor electrode segments 202 that are part of a sensor electrode 120, as well as switches for controlling activation of the sensor electrode segments 202. The arrangement 230 includes a small-sized sensor electrode segment $202_A$, an intermediate-sized sensor electrode segment $202_B$, and a large-sized sensor electrode segment $202_C$. The small-sized sensor electrode segment $202_A$ is located in a corner of the sensor electrode 120 and is square-shaped. The intermediate-sized sensor electrode segment $202_B$ is located roughly in the center of the sensor electrode 120, has an "L" shape, bounding two adjacent sides of the small-sized sensor electrode segment $202_A$. The plan area of the intermediate-sized sensor electrode segment $202_B$ is greater than a plan area of sensor electrode segment $202_A$ and less than the area of the large-sized sensor electrode segment $202_C$. The large-sized sensor electrode $202_C$ is located in the opposite side of the sensor electrode 120 relative to the small-sized sensor electrode segment $202_A$, has an "L" shape, bounds two sides of the intermediate-sized sensor electrode segment $202_B$, and is separate from the small-sized sensor electrode segment $202_A$ by the intermediate-sized sensor electrode segment $202_B$.

As described above, sensor electrode segments 202 each constitute a portion of sensor electrode 120. When sensor electrode 120 is driven for capacitive sensing, any or all sensor electrode segments 202 within sensor electrode 120 may be driven for capacitive sensing. Input device includes switches 304 for selectively coupling different sensor electrode segments 202 to sensor module 204 for capacitive sensing. Switches may include transistors or other elements that provide switching functionality as is generally known.

To operate the sensor electrode 120 for capacitive sensing, sensor module 204 determines which sensor electrode segments 202 are to be driven and causes switches 304 to open or close based on this determination. In one example, sensor module 204 may determine that only sensor electrode element $202_A$ should be driven for capacitive sensing, and in response to that determination, opens switch $304_B$ and switch $304_C$ and closes switch $304_A$. In another example, sensor module 204 may determine that only sensor electrode element $202_A$ and sensor electrode element $202_3$ should be driven for capacitive sensing, and in response to this determination, opens switch 304C and closes switch $304_A$ and switch $304_B$. In a further example, sensor module 204 may determine that sensor electrode element $202_A$, sensor electrode element $202_3$, and sensor electrode element $202_C$ should be driven for capacitive sensing, and closes switch $304_A$, switch $304_3$, and switch $304_C$ in response.

As described above, sensor module 204 (or another module in processing system 110 or electronic system 150) may determine which sensor electrode elements 202 in a sensor electrode 120 to activate based on the signal strength of resulting signals received after driving the sensor electrode 120. More specifically, when sensor module 204 drives a sensor electrode 120 for capacitive sensing and receives a resulting signal in response, sensor module 204 may determine that the resulting signal is below a low threshold for the operating range of a receiver module within the sensor module 204, corresponding to the sensor electrode 120 or above a high threshold for an operating range of a receiver module within the sensor module 204, corresponding to the sensor electrode 120. In response, sensor module 204 determines that the aggregate area of the sensor electrode 120 to be driven for capacitive sensing should be increased or decreased. When sensor module 204 next drives the sensor electrode 120 for capacitive sensing, sensor module 204 selects sensor electrode segments 202 in the sensor electrode 120 appropriate to this determination. In alternate embodiments, instead of detecting whether a resulting signal is below a low threshold or above a high threshold, sensor module 204 detects whether the resulting signal is below or equal to a low threshold or above or equal to a high threshold.

The ability to vary the signal strength corresponding to sensor electrodes 120 expands the effective range of distances at which input device 100 may detect presence of input objects 140. More specifically, the farther an input object 140 is from the input device 100, the lower the signal strength of the resulting signal corresponding to that input object 140. Similarly, the closer an input object 140 is, the higher the signal strength of the resulting signal. Decreasing the aggregate area with which a sensor electrode 120 is driven thus allows resulting signals from input objects 140 that are close (e.g., touching a surface of the input device 100) to the sensor electrode 120 to be within a corresponding operating range. Similarly, increasing the aggregate area with which the sensor electrode 120 is driven allows resulting signals from input objects 140 that are far (e.g., not touching a surface of the input device) from the sensor to be within a corresponding operating range.

To increase or decrease the aggregate area of a sensor electrode 120 that is driven for capacitive sensing, the sensor module 204 may couple and decouple sensor electrode segments 202 to the sensor module 204 in a specific sequence as the resulting signal becomes stronger or weaker. In one example, with the sensor electrode segment arrangement 230 illustrated in FIG. 3A, the sensor module 204 would first enable sensor electrode segment $202_A$, then would enable sensor electrode segment $202_B$, and then would enable sensor electrode segment $202_C$. Similarly, the sensor module 204 would first disable sensor electrode segment $202_C$, and then would disable sensor electrode segment $202_B$.

The high threshold and low threshold may be based on the relative aggregate areas of various combinations of sensor electrode segments 202. In one example, sensor electrode segment $202_A$ has a relative area of 1, sensor electrode segment $202_B$ has a relative area of 5, and sensor electrode segment $202_C$ has a relative area of 9. If sensor module 204 drives just sensor electrode segment $202_A$ for sensing, then a low threshold may be 6/15 maximum signal (where the maximum signal is a known highest allowable signal strength with the largest number of sensor electrode segments 202 enabled). If the resulting signal crosses below this low threshold, then the sensor module 204 would increase the number of sensor electrode segments 202 driven for capacitive sensing to be two—sensor electrode segment $202_A$ and sensor electrode segment $202_B$. In another example, sensor module 204 drives only sensor electrode segment $202_A$ and sensor electrode segment $202_B$ for capacitive sensing and receives a resulting signal that is greater than a maximum level. In response, the sensor module 204 decreases the number of sensor electrode segments 202 to drive for capacitive sensing.

Routing from the sensor electrode segments 202 to an area outside of sensing region 170 (and eventually to sensor module 204) may be accomplished with traces in the same layer as the sensor electrode segments 202. In one example, as shown in FIG. 3A, such traces may extend from edges of each segment situated on the same side (e.g., the left side) of the sensor electrode 120. These traces may then be routed down through a routing channel and away from the sensor electrodes 120.

As the number of sensor electrode segments 202 that are driven for capacitive sensing is varied, a centroid corresponding to the sensor electrode 120 may vary as well. The centroid represents a central position for all of the sensor electrode segments 202 that are driven. For example, if all of sensor electrode segment $202_A$, sensor electrode segment $202_B$, and sensor electrode segment $202_C$ are activated, then a centroid would be in the approximate center of the sensor electrode 120. If only sensor electrode segment $202_A$ is active, then a centroid would be in the center of sensor electrode segment $202_A$.

When the centroid changes, the detected position of an input object 140 may change as well. This change may occur because the logical position of a sensor electrode 120 generally encompasses the perimeter that surrounds all sensor electrode segments 202. However, the "centroid" or central position within a particular arrangement of sensor electrode segments 202 may vary from the center of the perimeter that surrounds all sensor electrode segments 202. Because of this discrepancy, the determined position of an input object 140 may vary from the actual position.

One manner of compensating for this changing centroid position is for the processing system 110 to alter the determined position information in a particular direction based on the difference between the centroid of the sensor electrode segments 202 that are being driven and the center of the sensor electrode 120 in which the sensor electrode segments 202 are located.

Figure 3B:
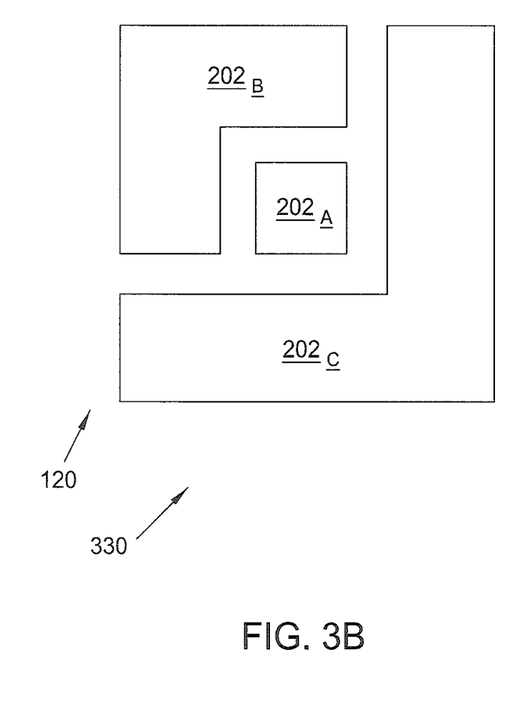

This change in centroid location may also be compensated for with particular arrangements of sensor electrode segments 202. FIG. 3B illustrates an example of an arrangement 330 of sensor electrode segments 202 configured to maintain a centroid in approximately the same position when the number of sensor electrode segments 202 that are driven for capacitive sensing is varied. The arrangement 330 includes a small-sized sensor electrode segment $202_A$, an intermediate-sized sensor electrode segment $202_B$, and a large-sized sensor electrode segment $202_C$. The small-sized sensor electrode segment $202_A$ is located in the center of the sensor electrode 120 and is square-shaped. The intermediate-sized sensor electrode segment $202_B$ is located at the top-left corner of the sensor electrode 120, has an "L" shape, bounding two adjacent sides of the small-sized sensor electrode segment $202_A$. The plan area of the intermediate-sized sensor electrode segment $202_B$ is greater than a plan area of the small-sized sensor electrode segment $202_A$ and less than the plan area of the large-sized sensor electrode segment $202_C$. The large-sized sensor electrode $202_C$ is located in an opposite side of the sensor electrode 120 relative to the intermediate-sized sensor electrode segment $202_B$, has an "L" shape, and bounds two sides of both the small-sized sensor electrode segment $202_A$ and the intermediate-sized sensor electrode segment $202_B$.

When only sensor electrode segment $202_A$ is driven for capacitive sensing, a centroid for sensor electrode 120 is located at the center of sensor electrode segment $202_A$, which also aligns with the center of the sensor electrode 120. This alignment is generally desirable because position data that results from driving the small-sized sensor electrode segment $202_A$, which is dependent on the centroid of the small-sized sensor electrode segment $202_A$ aligns with the center of the sensor electrode 120 as well. When sensor electrode segment $202_A$ and sensor electrode segment $202_B$ are activated, the centroid is approximately above and to the left of the sensor electrode segment $202_A$. While this centroid deviates slightly from the center of sensor electrode 120, the centroid remains in approximately the same location as the center of the sensor electrode 120. When sensor electrode segment 202A, sensor electrode $202_B$, and sensor electrode $202_C$ are activated, the centroid returns approximately to the center of the sensor electrode 120. Again, with this centroid aligned with the center of sensor electrode 120, position data received from the sensor electrode 120 aligns with the center of sensor electrode 120.

As with the sensor electrode arrangement 230 illustrated in FIG. 3A, routing from the sensor electrode segments 202 to an area outside of sensing region 170 (and eventually to sensor module 204) may be accomplished with traces in the same layer as the sensor electrode segments 202. As with the arrangement 230 shown in FIG. 3A, such traces may extend from edges of each segment situated on the same side (e.g., the left side) of the sensor electrode 120. These traces may then be routed down through a routing channel and away from the sensor electrodes 120. For the centrally located sensor electrode segment $202_A$, routing would flow through a space between sensor electrode segment $202_B$ and sensor electrode segment $202_C$.

Figure 3C:
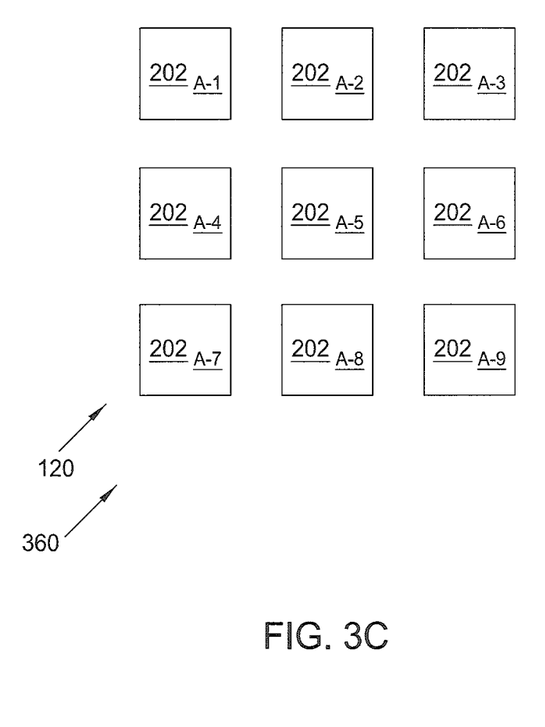

FIG. 3C illustrates another example of an arrangement 360 of sensor electrode segments 202. The arrangement 360 includes nine sensor electrode segments $202_{A-1}$-$202_{A-9}$ arranged in a grid. Each of sensor electrode segments $202_{A-1}$-$202_{A-9}$ may be of the same or different sizes. Any number of the sensor electrode segments $202_A$ may be activated for capacitive sensing. Further, sensor electrode segments $202_A$ that are not adjacent and are thus discontinuous may be activated for capacitive sensing, while sensor electrode segments $202_A$ situated between those activated sensor electrode segments $202_A$ are not activated.

Again, as with FIGS. 3A and 3B, routing from the sensor electrode segments 202 to an area outside of sensing region 170 (and eventually to sensor module 204) may be accomplished with traces in the same layer as the sensor electrode segments 202. In one example, such traces may extend from edges of each segment situated on the same side (e.g., the left side) of the sensor electrode 120. These traces may then be routed down through a routing channel and away from the sensor electrodes 120. The traces would be routed in between gaps that exist between the sensor electrode segments 202 before converging into the routing channel.

Although FIGS. 3A, 3B, and 3C depict certain arrangements of sensor electrode segments 202, many alternate arrangements are possible. The number, shape, placement, size, and other characteristics of the sensor electrode segments 202 may be varied as needed.

Figure 4:
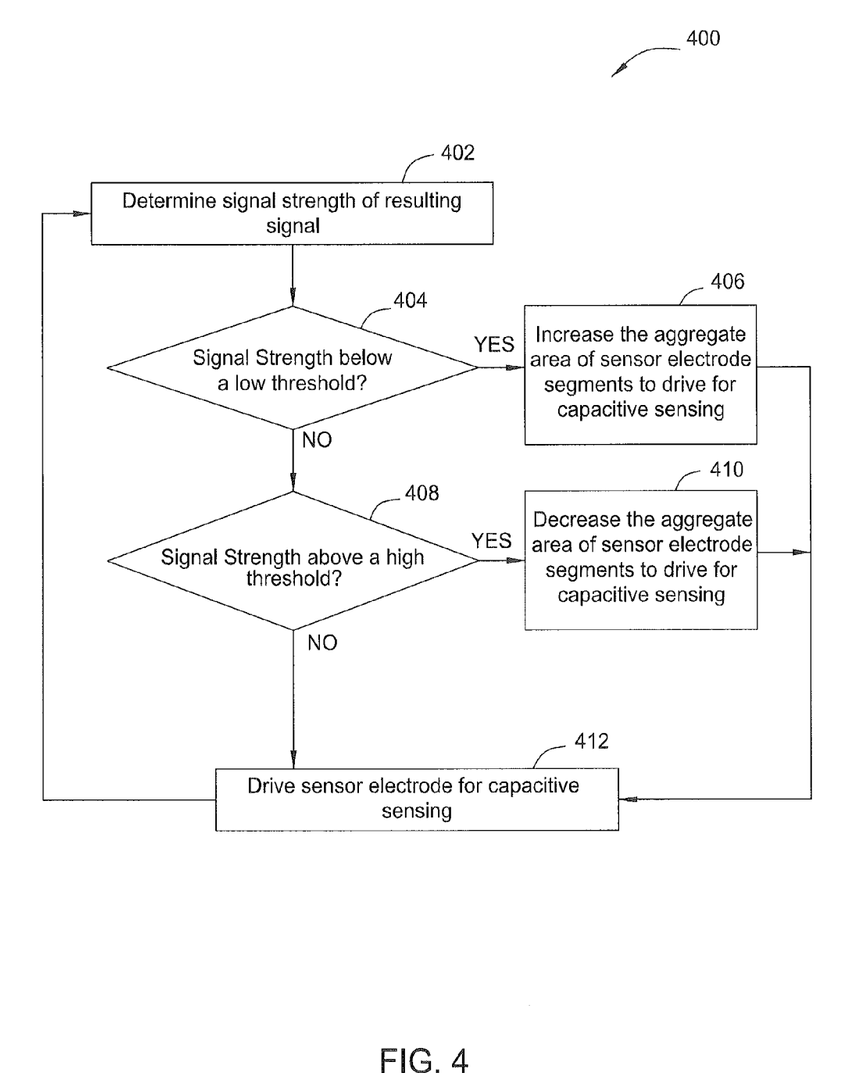
FIG. 4 illustrates a method for operating sensor electrodes including multiple sensor electrode segments, according to one embodiment described herein.

FIG. 4 is a flow chart of method steps for operating a sensor electrode 120 including several sensor electrode elements 202. As shown, a method 400 begins at step 402 in which sensor module 204 determines a signal strength of a resulting signal which is received as a result of driving the sensor electrode 120 for capacitive sensing. At step 404, the sensor module 204 determines whether the determined signal strength is below a low threshold. If the signal strength is below the low threshold, then the method proceeds to step 406, in which the sensor module 204 increases the aggregate area of sensor electrode segments 202 to drive for capacitive sensing. For example, the sensor module 204 can increase the number of sensor electrode segments 202 or change which segments are coupled to the sensor module 204 such that the aggregate area driven for capacitive sensing increases. After step 406, the method proceeds to step 412. At step 412, the sensor module 204 drives the sensor electrodes for capacitive sensing.

If, at step 404, the sensor module 204 determines that the signal strength is not below the low threshold, then the method proceeds to step 408. At step 408, the sensor module 204 determines whether the signal strength is above a high threshold. If the signal strength is above the high threshold, then the method proceeds to step 410. At step 410, the sensor module 204 decreases the aggregate area of sensor electrode segments to drive for capacitive sensing. For example, the sensor module 204 can decrease the number of sensor electrode segments 202 or change which sensor electrode segments 202 are coupled to the sensor module 204 such that the aggregate area driven for capacitive sensing decreases. After step 410, the method proceeds to step 412, where, again, the sensor module 240 drives the sensor electrodes for capacitive sensing. After step 412, the method returns to step 402.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A processing system for an input device, the processing system comprising:
    a sensor module comprising sensor circuitry configured to:
        drive a first number of a first plurality of segments comprising a first sensor electrode of a plurality of sensor electrodes of the input device to determine a first capacitive coupling between the first sensor electrode and an input object, and
        drive a second number of the first plurality of segments of the first sensor electrode to determine a second capacitive coupling between the first sensor electrode and the input object, in response to determining that the first capacitive coupling is outside of an operating range of the sensor module corresponding to the first number of segments,
    wherein the first number is different from the second number.

2. The processing system of claim 1, wherein the touch sensor module is configured to utilize a greater number of segments for determining the second capacitive coupling in response to the first capacitive coupling being lower than a low threshold of the operating range.

3. The processing system of claim 1, wherein the touch sensor module is configured to utilize a lower number of segments for determining the second capacitive coupling in response to the first capacitive coupling being higher than a high threshold of the operating range.

4. The processing system of claim 1, wherein each sensor electrode of the plurality of sensor electrodes comprises a different common electrode segment of a segmented common-voltage-layer.

5. The processing system of claim 1, further comprising:
    a plurality of switches operable to selectively connect segments of the electrodes.

6. The processing system of claim 5, further comprising:
    a substrate, wherein the sensor electrodes and the plurality of switches are disposed on the substrate.

7. The processing system of claim 1, further comprising:
    a single integrated circuit configured to perform capacitive touch sensing, wherein the touch sensor module is included in the single integrated circuit.

8. The processing system of claim 7, wherein the single integrated circuit is also configured to drive display updating.

9. The processing system of claim 1, wherein the second number of segments has a second centroid that is in approximately the same location as a first centroid of the first number of segments.

10. The processing system of claim 1, wherein the touch sensor module is further configured to maintain a first baseline value for the first number of segments and a second baseline value for the second number of segments.

11. The processing system of claim 1, wherein:
    the first sensor electrode is located near a center of a sensing region;
    a second sensor electrode of the plurality of sensor electrodes is located near a periphery of the sensing region;
    the first sensor electrode includes a first group of segments and the second sensor electrode includes a second group of segments; and
    the first group of segments has a first segment pattern that is different than a second segment pattern of the second group of segments.

12. The processing system of claim 1, further comprising:
    a second sensor electrode of the plurality of sensor electrodes, the second sensor electrode including a second plurality of segments; and
    wherein the touch sensor module is further configured to:
        drive a third number of segments of the second sensor electrode to determine a third capacitive coupling between the second sensor electrode and the input object;
        determine that the third capacitive coupling is outside of an operating range corresponding to the third number of segments; and drive a fourth number of segments of the second sensor electrode to determine a fourth capacitive coupling between the second sensor electrode and the input object;

wherein the operating range corresponding to the first number of segments is approximately the same as the operating range corresponding to the third number of segments, wherein the third capacitive coupling is outside of the operating range corresponding to the third number of segments to a similar degree as the first capacitive coupling is outside of the operating range corresponding to the first number of segments, and wherein the second number of segments comprises a different segment configuration than the fourth number of segments.

13. The processing system of claim 1, wherein the second number of segments includes at least two segments that are non-contiguous.

14. An input device comprising:
a plurality of sensor electrodes; and
a sensor module comprising sensor circuitry configured to:
drive a first number of a first plurality of segments comprising a first sensor electrode of the plurality of sensor electrodes to determine a first capacitive coupling between the first sensor electrode and an input object, and drive a second number of the first plurality of segments of the first sensor electrode to determine a second capacitive coupling between the first sensor electrode and the input object in response to determining that the first capacitive coupling is outside of an operating range of the sensor module corresponding to the first number of segments, wherein the first number is different from the second number.

15. The input device of claim 14, wherein the touch sensor module is configured to utilize a greater number of segments for determining the second capacitive coupling in response to the first capacitive coupling being lower than a low threshold of the operating range.

16. The input device of claim 14, wherein the touch sensor module is configured to utilize a lower number of segments for determining the second capacitive coupling in response to the first capacitive coupling being higher than a high threshold of the operating range.

17. The input device of claim 14, wherein the second number of segments has a second centroid that is in approximately the same location as a first centroid of the first number of segments.

18. A method for operating an input device, the method comprising:
driving a first number of a first plurality of segments comprising a first sensor electrode of a plurality of sensor electrodes of the input device to determine a first capacitive coupling between the first sensor electrode and an input object, and driving a second number of the first plurality of segments of the first sensor electrode to determine a second capacitive coupling between the first sensor electrode and the input object, in response to determining that the first capacitive coupling is outside of an operating range of the sensor module corresponding to the first number of segments, wherein the first number is different from the second number.

19. The method of claim 18, wherein driving the second number of segments comprises utilizing a greater number of segments for determining the second capacitive coupling in response to the first capacitive coupling being lower than a low threshold of the operating range.

20. The method of claim 18, wherein the second number of segments has a second centroid that is in approximately the same location as a first centroid of the first number of segments.

* * * * *